US 8,816,536 B2

(12) United States Patent
Borke et al.

(10) Patent No.: US 8,816,536 B2
(45) Date of Patent: Aug. 26, 2014

(54) APPARATUS AND METHOD FOR WIRELESSLY POWERED DISPENSING

(75) Inventors: Brian S. Borke, Appleton, WI (US); Andre Lanouette, Appleton, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 327 days.

(21) Appl. No.: 13/303,524

(22) Filed: Nov. 23, 2011

(65) Prior Publication Data

US 2012/0133213 A1     May 31, 2012

Related U.S. Application Data

(60) Provisional application No. 61/416,888, filed on Nov. 24, 2010.

(51) Int. Cl.
*H01F 27/42* (2006.01)
*H02J 17/00* (2006.01)

(52) U.S. Cl.
CPC ...................................... *H02J 17/00* (2013.01)
USPC ............... 307/104; 307/149; 307/82; 307/39; 222/333; 222/63; 222/325; 222/52; 340/573.1; 340/854.8; 340/538.16; 700/236; 700/231

(58) Field of Classification Search
USPC ............... 307/104; 222/52, 63, 333; 700/258, 700/236, 231; 340/573.1, 854.8, 538.16, 340/12.38; 342/42
See application file for complete search history.

(56) References Cited

U.S. PATENT DOCUMENTS

| | | | |
|---|---|---|---|
| 4,685,047 A | 8/1987 | Phillips, Sr. | |
| 6,104,349 A | 8/2000 | Cohen | |
| 6,127,977 A | 10/2000 | Cohen | |
| 6,140,975 A | 10/2000 | Cohen | |
| 6,289,237 B1 | 9/2001 | Mickle et al. | |
| 6,445,352 B1 | 9/2002 | Cohen | |
| 6,452,553 B1 | 9/2002 | Cohen | |

(Continued)

FOREIGN PATENT DOCUMENTS

WO     2010094393 A1     8/2010

OTHER PUBLICATIONS

Powercast Product Datasheet—P1110—915 MHz RF Powerharvest™ Receiver, 10 pages, 2010 Powercast Corporation, www.powercastco.com.

(Continued)

*Primary Examiner* — Jared Fureman
*Assistant Examiner* — Jagdeep Dhillon
(74) *Attorney, Agent, or Firm* — Sutherland Asbill & Brennan LLP

(57) ABSTRACT

A system includes a dispenser and a transmitter. The dispenser is configured to support and dispense product. The dispenser includes: a housing; an antenna disposed and configured to receive electromagnetic energy that originates from the transmitter; a power supply disposed within the housing and configured to convert the electromagnetic energy received at the antenna into DC (direct current) power; a dispenser mechanism configured and disposed to dispense the product from the dispenser on command; a controller disposed in operable communication with the power supply and the dispenser mechanism; and, an actuator disposed in operable communication with the controller. Upon actuation of the actuator, and upon presence of the DC power, the controller is responsive to facilitate action by the dispenser mechanism to dispense the product. The transmitter is configured to transmit electromagnetic energy and is disposed in operable communication with the dispenser.

22 Claims, 10 Drawing Sheets

(56) References Cited

U.S. PATENT DOCUMENTS

| | | |
|---|---|---|
| 6,476,766 B1 | 11/2002 | Cohen |
| 6,615,074 B2 | 9/2003 | Mickle et al. |
| 6,856,291 B2 | 2/2005 | Mickle et al. |
| 6,882,128 B1 | 4/2005 | Rahmel et al. |
| 6,985,122 B2 | 1/2006 | Cohen |
| 7,019,695 B2 | 3/2006 | Cohen |
| 7,027,311 B2 | 4/2006 | Vanderelli et al. |
| 7,057,514 B2 | 6/2006 | Mickle et al. |
| 7,084,605 B2 | 8/2006 | Mickle et al. |
| 7,126,537 B2 | 10/2006 | Cohen |
| 7,145,513 B1 | 12/2006 | Cohen |
| 7,190,318 B2 | 3/2007 | Cohen |
| 7,215,290 B2 | 5/2007 | Cohen |
| 7,256,751 B2 | 8/2007 | Cohen |
| 7,373,133 B2 | 5/2008 | Mickle et al. |
| 7,383,064 B2 | 6/2008 | Mickle et al. |
| 7,403,803 B2 | 7/2008 | Mickle et al. |
| 7,440,780 B2 | 10/2008 | Mickle et al. |
| 7,567,824 B2 | 7/2009 | Mickle et al. |
| 7,639,994 B2 | 12/2009 | Greene et al. |
| 7,643,312 B2 | 1/2010 | Vanderelli et al. |
| 8,552,592 B2 * | 10/2013 | Schatz et al. .................. 307/104 |
| 2006/0238365 A1 | 10/2006 | Vecchione et al. |
| 2007/0191075 A1 | 8/2007 | Greene et al. |
| 2008/0018302 A1 | 1/2008 | Reinsel et al. |
| 2008/0078777 A1 | 4/2008 | Cittadino et al. |
| 2008/0309452 A1 | 12/2008 | Zeine |
| 2009/0254218 A1 * | 10/2009 | Sandin et al. ................. 700/258 |
| 2009/0308933 A1 | 12/2009 | Osada |
| 2010/0073162 A1 | 3/2010 | Johnson et al. |
| 2010/0219206 A1 | 9/2010 | Ophardt |
| 2010/0237096 A1 * | 9/2010 | Wegelin .......................... 222/52 |
| 2010/0252569 A1 | 10/2010 | Pelfrey |

OTHER PUBLICATIONS

Micropower High Efficiency DC/DC Converters with Low-Battery Detector Adjustable and Fixed 5V, Linear Technology, LT1303/LT1303-5, 12 pages. 1995.

* cited by examiner

APPARATUS AND METHOD FOR WIRELESSLY POWERED DISPENSING

CROSS-REFERENCE TO RELATED APPLICATIONS

This application claims the benefit of U.S. Provisional Application No. 61/416,888, filed Nov. 24, 2010, which is incorporated by reference herein in its entirety.

BACKGROUND OF THE INVENTION

The present disclosure relates generally to product dispensers, and particularly to product dispensers that are wirelessly powered.

There may be many dispensers within a building or facility that use electrical power for automated dispensing and/or actuation. Such dispensers include paper sheet product dispensers, soap, and lotion or fragrance dispensers, for example, which may be actuated via a proximity sensor, such as an infrared (IR) sensor, for example. In many installations, electrical power is provided to the dispensers via hard wired connections, however, battery powered dispensers are also used when hard wiring is a less viable option. A drawback with battery-powered devices, however, is that the batteries occasionally need to be replaced.

Accordingly, and while existing dispensers may be suitable for their intended purpose, there remains a need in the art for a wirelessly powered dispenser system that overcomes the aforementioned drawbacks.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment includes a dispenser configured to support and dispense product. The dispenser includes: a housing; an antenna disposed and configured to receive electromagnetic energy that originates outside of the housing; a power supply disposed within the housing and configured to convert the electromagnetic energy received at the antenna into DC (direct current) power; a dispenser mechanism configured and disposed to dispense the product from the dispenser on command; a controller disposed in operable communication with the power supply and the dispenser mechanism; and, an actuator disposed in operable communication with the controller. Upon actuation of the actuator, and upon presence of the DC power, the controller is responsive to facilitate action by the dispenser mechanism to dispense the product.

An embodiment includes a power unit for a product dispenser configured for battery operation, the dispenser having a battery compartment with electrical terminals. The power unit includes: an antenna configured to receive electromagnetic energy; and, a power supply disposed and configured to convert the electromagnetic energy received at the antenna into DC (direct current) power. The antenna and the power supply are configured to fit within the battery compartment, and the power supply is configured to electrically connect with the electrical terminals of the battery compartment.

An embodiment includes a handheld meter having: a housing; an antenna disposed and configured to receive electromagnetic energy that originates outside of the housing; a tuned circuit disposed in electrical communication with the antenna; a detector circuit disposed in electrical communication with the tuned circuit; and, an output device disposed in electrical communication with the detector circuit, the output device being configured to provide information to a user that relates to a signal strength of the electromagnetic energy received at the antenna. The information provided to the user relates to the amount of RF energy available for powering one or more product dispensers, and relates to the orientation of a receiving antenna disposed within an associated one of the product dispensers for generating optimal power at a location of interest for placement of the associated dispenser.

An embodiment includes a system having: a dispenser configured to support and dispense product; and, a transmitter configured to transmit electromagnetic energy, and disposed in operable communication with the dispenser. The dispenser includes: a housing; an antenna disposed and configured to receive electromagnetic energy that originates from the transmitter; a power supply disposed within the housing and configured to convert the electromagnetic energy received at the antenna into DC (direct current) power; a dispenser mechanism configured and disposed to dispense the product from the dispenser on command; a controller disposed in operable communication with the power supply and the dispenser mechanism; and, an actuator disposed in operable communication with the controller. Upon actuation of the actuator, and upon presence of the DC power, the controller is responsive to facilitate action by the dispenser mechanism to dispense the product.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Dispensers, such as sheet product dispensers and flowable liquid product dispensers, may use electrical power from a utility socket or a battery to power various features of the dispensers. The use of a utility socket may limit placement options for the dispensers to locations proximate to a utility socket. Battery powered dispensers increase the placement options, however batteries eventually discharge, prompting either a recharge of the battery or a replacement of the battery.

The embodiments described below offer a system and method for wirelessly providing power to a dispenser. In this regard, the dispenser may be powered via a wireless power feature. The wireless power may be provided by a wireless transmitter unit of the system that is located proximate to the dispenser, or in some instances, ambient signals of particular frequencies may be received and converted into power by the dispenser. In some embodiments, the dispenser may include a battery that may be recharged wirelessly via the wireless power feature.

While embodiments described herein depict a sheet product dispenser as an example product dispenser, it will be appreciated that the disclosed invention is also applicable to other types of product dispensers, including dispensers for a flowable liquid such as a fragrance, lotion, or soap, for example.

An embodiment of the invention, as shown and described by the various figures and accompanying text, provides a product dispenser that is either wirelessly powered, switchable between battery operation or wirelessly-powered operation, or powered by both wireless power and battery power. An antenna receives and supplies available electromagnetic energy to a power supply that converts the electromagnetic energy into regulated DC (direct current) power, which is usable by a dispensing mechanism of the product dispenser to dispense product upon command. When the available electromagnetic energy is purposefully generated by a transmitter (see transmitter 215 in FIG. 5 for example), the antenna is said to harvest purposeful electromagnetic energy. When the available electromagnetic energy is present due to other devices having other purposes (such as cell phones, cell phone towers, or radio towers, for example), the antenna is said to scavenge ambient electromagnetic energy.

Figure 1:
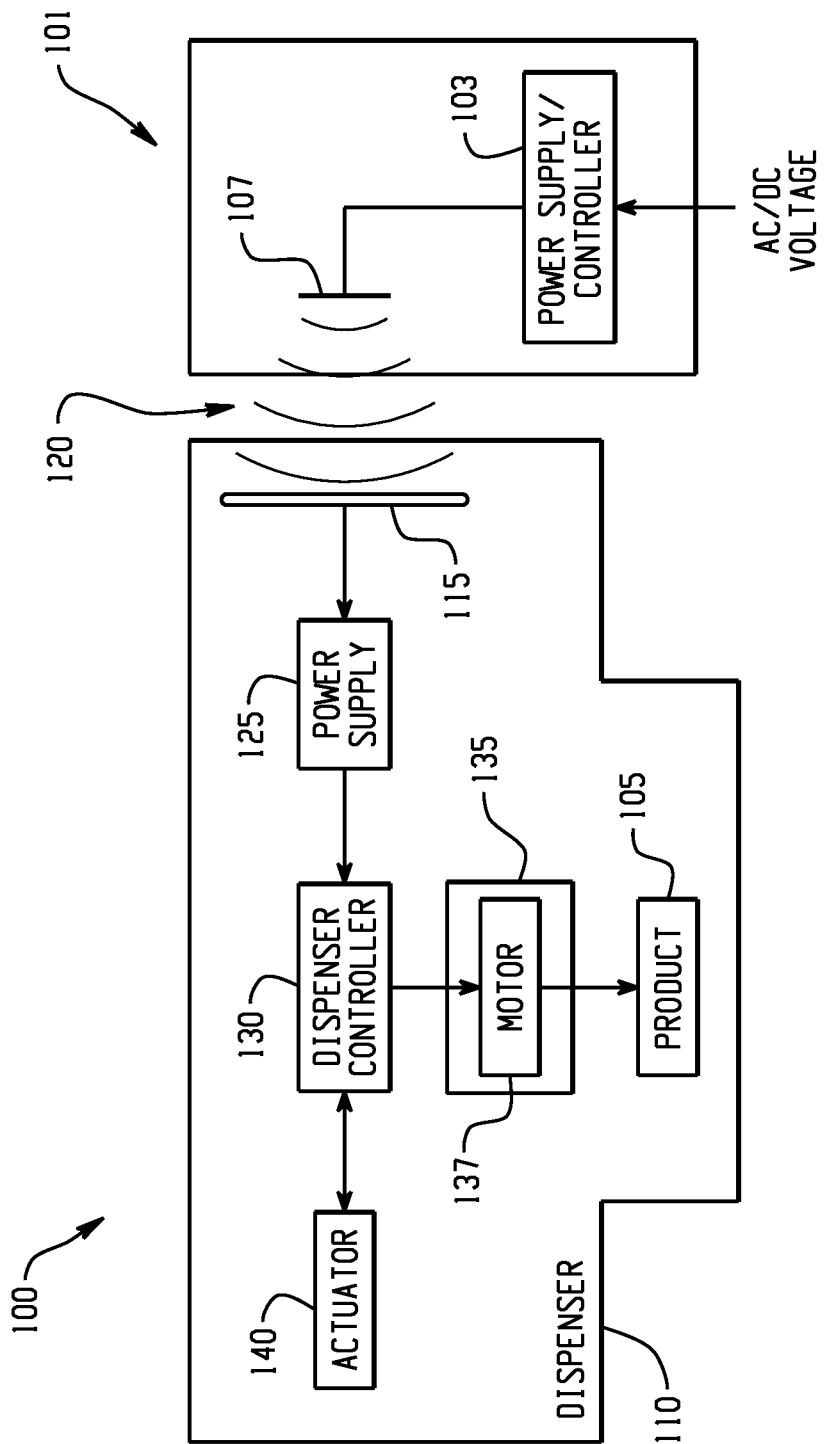
FIG. 1 depicts in block diagram form a dispenser in accordance with an embodiment of the invention.

FIG. 1 depicts in block diagram form a dispenser 100 that is configured to support and dispense product 105 such as sheet product (such as paper towels, toilet paper, or tissues, for example) via a housing 110. However, as discussed above, other product may be dispensed, all in accordance with an embodiment of the invention disclosed herein. In the illustrated embodiment, the product 105 is loaded within the housing 110 and is dispensed therefrom. In another embodiment, the product is provided in a cartridge that is loaded into the housing or is positioned adjacent to the housing 110. For example, the product may be a bag housing a flowable liquid product such as soap. The bag may be loaded into the housing 110 and may be refilled or replaced once depleted. As another example, the product may be a box housing a rolled or folded product such as paper towel. The box may be positioned adjacent to the housing in communication with a dispensing mechanism within the housing 110. The box may be refilled or replaced once depleted.

In an embodiment, the dispenser 100 includes an antenna 115 disposed and configured to receive electromagnetic energy 120 that originates outside of the housing 110. The electromagnetic energy 120 may be generated by a designated transmitter, such as a radio-frequency transmitter, or by other devices within range of the dispenser, such as television, radio, or cell phone towers (emission antennas), cell phones, pagers, and cordless phones, among others and combinations thereof. In an embodiment, the electromagnetic energy is radio frequency (RF) power, such as RF power of about 900 Mega-Hertz and 1 Watt at its source, which has a frequency wavelength of about 13-inches, at 915 Mega-Hertz, although other configurations may be used.

The dispenser 100 further includes a power supply 125, disposed within the housing 110, which is configured to convert the electromagnetic energy received at the antenna 115 into DC (direct current) power. In an embodiment, the power supply 125 includes a receiver, such as a RF receiver, to provide the desired DC voltage, such as 4 Vdc for example. One example of such a receiver is a P1110 915-MHz RF Powerharvester Receiver™, available from Powercast Corporation of Pittsburgh, Pa. If higher operational voltage is desired, a boost converter may be employed, which will be discussed further below. In an embodiment, the receiver may have an internally disposed regulator to provide the DC power at a regulated DC voltage, such as 4 Vdc for example. While reference is made to a RF receiver, other suitable receivers may be used.

In an embodiment utilizing a 915-MHz RF receiver, the antenna 115 may be a 6.1 dBi antenna having an impedance of 50-ohm and being tuned to receive 850-950 MHz RF energy. As will be appreciated by one skilled in the art, dBi refers to dB (isotropic), which relates to the forward gain of an antenna. While reference is made to a 6.1 dBi antenna, it will be appreciated that antennas having other forward gains may also be suitable for practicing an embodiment of the invention, such as a 12.5 dBi antenna for example. Such other antennas are considered within the scope of an invention disclosed herein.

The dispenser 100 further includes a controller 130 disposed in operable communication with the power supply 125 and a dispenser mechanism 135, the dispenser mechanism 135 being configured and disposed to dispense the product from the dispenser 100 on command via operation of a motor 137.

An actuator 140, such as an infrared (IR) sensor for example, is disposed in operable communication with the controller 130, where upon actuation of the actuator 140, such as a user waving their hand in front of the actuator 140 for example, and in the presence of the DC voltage, which may be a regulated DC voltage, from the power supply 125, the controller 130, which is responsive to machine-executable instructions executed at the controller 130, is responsive to facilitate action by the dispenser mechanism 135 to dispense the product 105. By employing an IR sensor for actuator 140, operation of the dispenser 100 may be mostly unaffected by the presence of RF energy, however, any type of actuator 140 suitable for a purpose disclosed herein may be employed.

Example dispensers that may be suitable for being powered by a power supply 125 as disclosed herein are disclosed in the following co-owned U.S. patents and patent applications: U.S. Pat. Nos. 6,592,067; 7,793,882; 7,984,872; U.S. Publication No. 2008/0078777; U.S. Publication No. 2010/0286817; and U.S. Publication No. 2010/0286818; the contents of which are incorporated herein by reference in their entirety.

The physical dimensions of dispenser 100 are compatible with those of the antenna 115. For example, RF energy centered around 900 MHz has a wavelength of about 13-inches. As such, a suitable antenna tunable to receive 900 MHz RF energy may have a characteristic dimension that is an integer or fractional multiple of 13-inches, such as 3.25-inches, 6.5- inches, 13-inches, 26-inches, etc. In an example embodiment, the dispenser 100 has a characteristic width dimension of about 13-inches, thereby accommodating an antenna of about 13-inches in length. In an embodiment, an antenna design such as a fractal antenna may be used to maximize the amount of radio energy that may be harvested or scavenged within the dimensions of dispenser 100. The antenna 115 may be omni-directional (for example, a whip antenna), or directional (for example, a panel or vagi antenna). If a directional antenna is employed, the antenna is preferably oriented in a direction to best receive the RF energy. An apparatus and method for ascertaining the strength and direction of RF energy useful for a purpose disclosed herein will be discussed in more detail below.

In an embodiment, the power supply 125 includes a voltage converter to provide the DC power at a stepped up voltage on an output side of the voltage converter relative to an input side of the voltage converter. In an embodiment, it is contemplated that the voltage converter may be a boost converter that is integrally arranged as part of the receiver, for example, and/or the boost converter may be separately arranged downstream of the receiver, which will now be discussed with reference to FIG. 2.

A transmitter 101 may be used to transmit RF energy to the dispenser 100. In this regard, the transmitter 101 includes a power supply and controller 103 that receives power from an external source such as, for example, a DC battery, or an AC voltage source such as an electrical socket. The power supply and controller 103 receive the power and output an RF signal 120 via the antenna 107.

Figure 2:
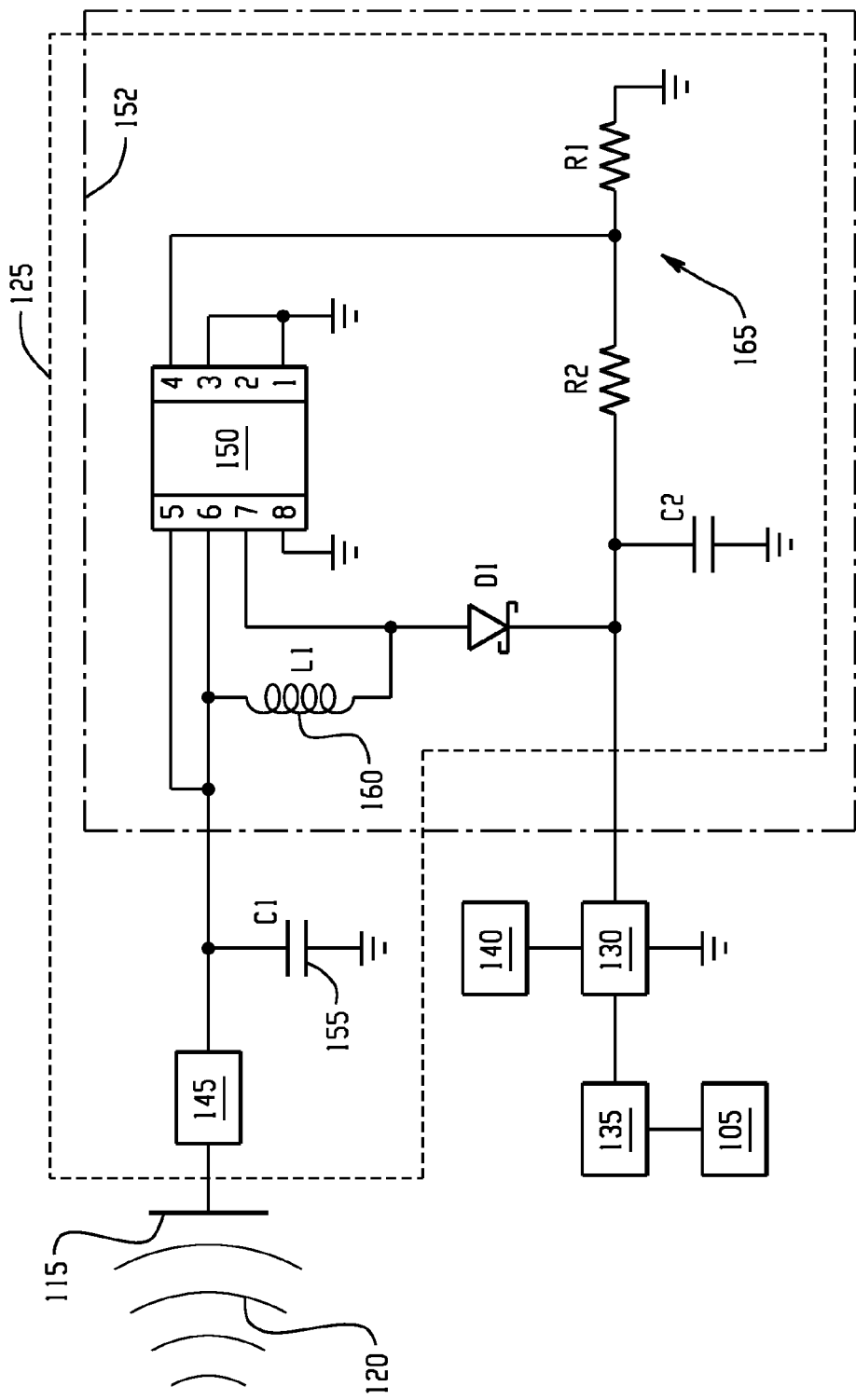
FIG. 2 depicts a block diagram schematic of an example power supply suitable for powering the dispenser of FIG. 1 in accordance with an embodiment of the invention.

FIG. 2 depicts a block diagram schematic of an example power supply 125 suitable for a purpose disclosed herein. Features of FIG. 2 that are in common with features of FIG. 1 are depicted with like reference numerals, such as the antenna 115, the harvested electromagnetic energy 120, the controller 130, the dispenser mechanism 135, and the actuator 140, for example. The energy conversion from electromagnetic energy to DC power, and the power flow to the controller, are the same as that discussed above in connection with FIG. 1. However, other features of FIG. 2 will now be discussed in more detail.

In an embodiment, the power supply 125 includes an energy conversion device 145, such as a 915-MHz RF receiver, for example, which receives RF energy 120 via antenna 115, and converts the RF energy into DC power at a first voltage level, such as 2-4 Vdc for example. A boost converter 152 includes a boost converter controller 150, such as a micropower controller, for example, and is electrically connected to the output of the energy conversion device 145 and serves to convert the DC power at the first voltage level into DC power at a second voltage level greater than the first voltage level, such as 6 Vdc for example. An example of a boost converter controller 150 is an LT1303CN8 micropower controller, available from Linear Technology Corporation of Milpitas, Calif. An energy storage device 155, such as a capacitor C1 or a set of rechargeable batteries for example, is electrically connected between the energy conversion device 145 and the boost converter 152. As seen in FIG. 2, the energy storage device 155 is disposed and configured to receive and store the DC power at the first voltage level from the energy conversion device 145, and the boost converter 152 is disposed and configured to controllably discharge energy from the energy storage device 155 and to deliver the DC power at the second voltage level to the controller 130. An energy storage inductive device 160, such as an inductor L1 for example, is electrically connected between the energy storage device 155 and the boost converter controller 150, across pins 6 and 7 of the boost converter controller 150. The boost converter controller 150 is disposed and configured to switch the energy storage inductive device 160 in and out of the circuit path that delivers the DC power at the second voltage level to the controller 130, and serves to control the rate of switching of the energy storage inductive device 160 to control the rate of discharge of energy from the energy storage device 155.

A voltage divider network 165 having resistors R1 and R2, a storage capacitor C2, and a diode D1, are electrically connected to the boost converter controller 150 to further control the DC power at the second voltage level of 6 Vdc. Grounding points of power supply 125 are as depicted in FIG. 2.

In an embodiment, C1 is 1-4 Farad (F), such as about 2.35 F for example, L1 is about 100 micro-Henries, R1 is about 241 kilo-Ohms, R2 is about 1 mega-Ohm, C2 is about 100 micro-Farad, and D1 is a diode. While certain electrical components and component values are depicted and described, it will be appreciated that the scope of the invention is not limited to only those electrical components or component values disclosed.

Figure 3:
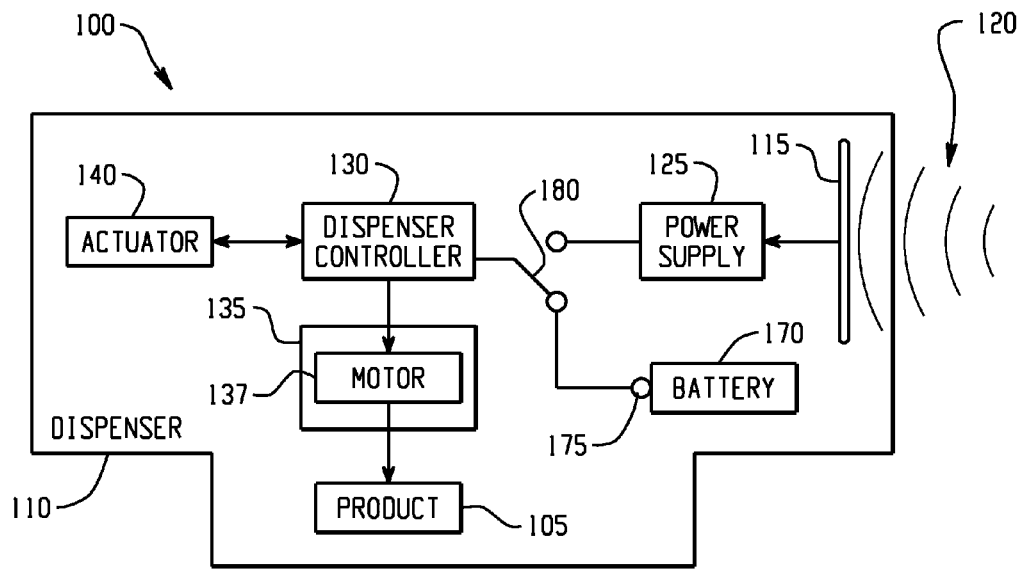
FIG. 3 depicts an alternative dispenser to that of FIG. 1 in accordance with an embodiment of the invention.
Figure 3A:
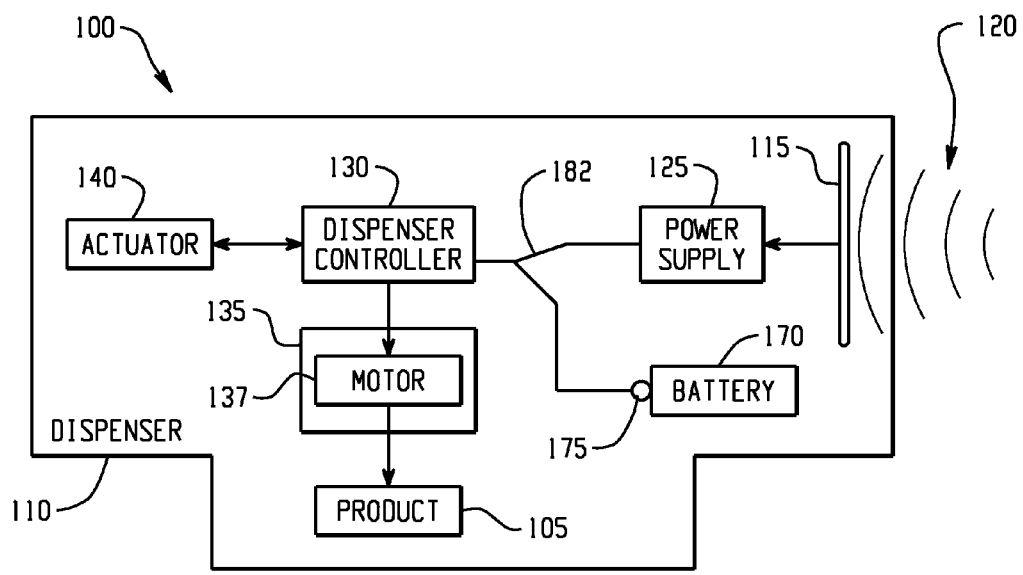
FIG. 3A depicts an alternative dispenser to that of FIG. 3 in accordance with an embodiment of the invention.

In an alternative embodiment, and with reference now to FIG. 3 where like elements are numbered alike, the dispenser 100 includes a battery housing 170 (alternatively herein referred to as a battery compartment) configured to house a plurality of industry standard battery cells (see reference numeral 185 in FIG. 4B for example), where each of the plurality of battery cells that may include, for example, a AAA, AA, C or D-cells. The battery cells employed may be of the same type or different types. I The battery housing 170 includes terminals 175 for connecting the plurality of battery cells 185 to and for providing battery power to the controller 130. A switch 180 is disposed and configured to provide DC power to the controller 130 via the plurality of battery cells 185, or alternatively via the power supply 125. In an embodiment, the switch 180 is accessible from inside the housing 110 of the dispenser 100, and is intended for access only by authorized maintenance personnel for switching between the two power supplies as deemed necessary. In an embodiment, the switch 180 is controlled by the controller 130 to draw power from the appropriate power source on demand. For example, power may be supplied from the batteries 185 when the motor 137 is operational, and power may be supplied from the power supply 125 when the motor 137 is not operational and the batteries are being trickle charged. In an alternative embodiment, and with reference to FIG. 3A, power is supplied by both the batteries 185 and the power supply 125 via a parallel connection 182.

Figure 4A:
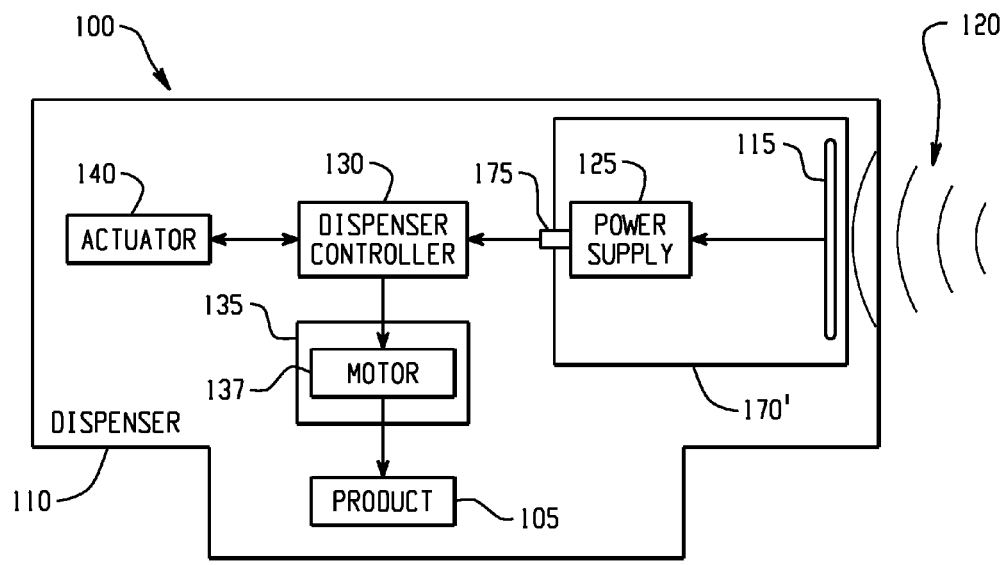
FIG. 4A depicts another alternative dispenser to that of FIG. 1 in accordance with an embodiment of the invention.
Figure 4B:
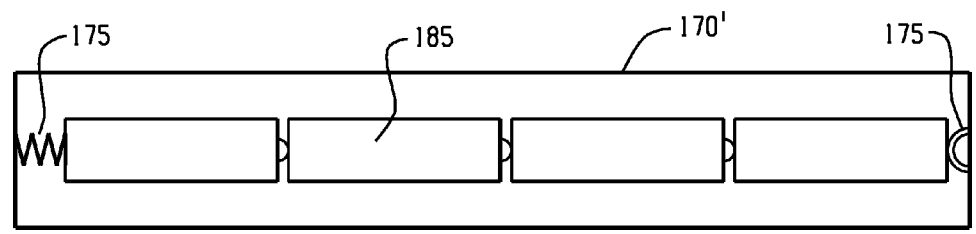
FIG. 4B depicts a battery compartment for use in accordance with an embodiment of the invention.
Figure 4C:
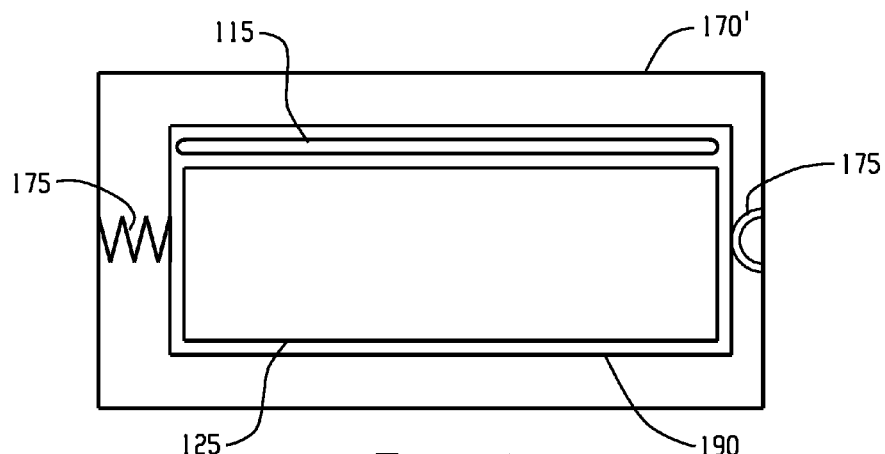
FIG. 4C depicts a power unit in accordance with an embodiment of the invention.

In a further alternative embodiment, and with reference now to FIGS. 4A, 4B and 4C, where like elements are numbered alike, the dispenser 100 includes a battery housing 170' configured to house a plurality of battery cells 185. For example, the battery cells may be industrial standard battery cells, such as AAA, AA, C or D-cells, for example. The battery housing includes terminals 175 for connecting the plurality of battery cells to and for providing battery power to the controller 130. In contrast with the embodiment of FIG. 3, the embodiment of FIGS. 4A, 4B and 4C, is such that the antenna 115 and the power supply 125 are configured to fit within the battery housing 170' in place of the plurality of battery cells 185. Here, the power supply 125 is configured to electrically connect with the terminals 175 of the battery housing 170', thereby providing for a retrofit kit that can turn a battery powered dispenser into a wirelessly powered dispenser with little or no modification to an already installed dispenser 100.

In an embodiment, the power supply 125 of FIG. 4C may have a energy storage device 155 in the form of a capacitor C1, as depicted in FIG. 1, or may have a set of rechargeable batteries in place of capacitor C1, as discussed above, or may have both. In either embodiment, the power supply 125 is provided as a retrofit kit.

In view of the foregoing discussion relating to the antenna 115 and power supply 125 being retrofittable into a battery compartment 170' of a dispenser 100, it will be appreciated that an embodiment of the invention also includes a standalone power unit 190, also herein referred to by reference to power supply 125 plus antenna 115 as depicted in FIG. 4C, suitable for use in a product dispenser 100, which itself is configured for battery operation, where the dispenser 100 has a battery compartment 170' with electrical terminals 175, where the antenna 115 and power supply 125 are configured to fit within the battery compartment 170', and where the power supply 125 is configured to electrically connect with the electrical terminals 175 of the battery compartment 170'. In such a standalone power unit 190, the antenna 115 and power supply 125 function as described above, and have features and alternative features as discussed above where reference is made to like reference numerals. In an embodiment, the standalone power unit 190 also includes an energy storage device, such as a capacitor or a set of batteries, for example.

While reference is made herein to the standalone power unit 190 being installable within the battery compartment 170', it will be appreciated from other embodiments disclosed herein that the standalone power unit 190 may also be employed as an auxiliary power supply 190 external of the battery compartment 170', such as an auxiliary power supply 190 electrically connected in parallel with the power supply 125 and/or the battery compartment 170, 170', for example.

With consideration to the foregoing discussion of structure relating to a product dispenser 100 that is wirelessly powered, or switchable between battery operation or wirelessly-powered operation, or powered by wireless power and by battery power via a parallel connection, an example mode of operation of such a dispenser 100 will now be described.

As discussed above, dispenser 100 may include a plurality of battery cells 185 and/or a power supply 125. The power supply 125 may be electrically connected in parallel with the plurality of battery cells 185 via a parallel connection 182 or via a switch 180, as discussed above. However, for purposes of this discussion, operation of the dispenser 100 will be discussed in relation to the dispenser 100 being wirelessly powered using a power supply 125 and with reference to FIG. 2.

In the presence of RF energy 120 sufficient to energize the power supply 125, the energy conversion device 145 responds to the RF energy 120 by converting the RF energy 120 into a DC voltage of about 2-4 Vdc, which charges the capacitor 155, or rechargeable batteries if employed in place of the capacitor 155. The boost converter controller 150 receives voltage input from the energy conversion device 145 and/or charged capacitor 155, and selectively switches the energy storage inductive device 160 ON and OFF to build up a stepped-up voltage of about 6 Vdc at output capacitor C2 across diode D1, thereby providing operational voltage for the controller 130. Upon actuation of the actuator 140 by a user requesting a dispensing action from the dispenser 100, controller 130 activates the dispenser mechanism 135 to cause dispensing of the product 105.

In an alternative embodiment, the controller 130 facilitates operation of the boost converter controller 150 so that the boost converter controller 150 is energized only when necessary to provide power to the actuator 140 and dispenser mechanism 135 as required for a dispensing action, thereby conserving energy.

Figure 5:
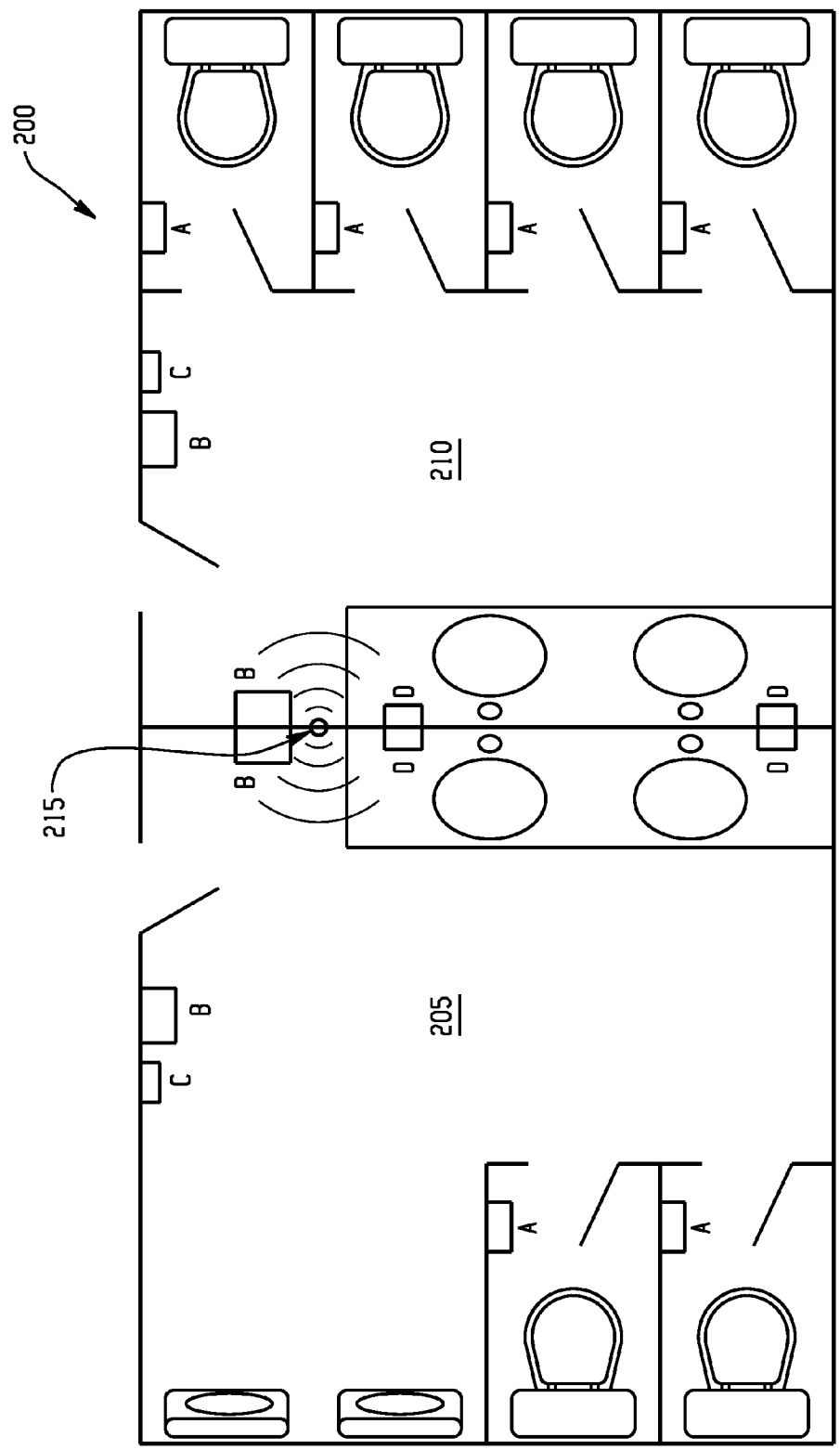
FIG. 5 depicts a washroom floor space suitable for using an embodiment of the invention.

With reference now to FIG. 5, a dispenser 100 can be seen distributed in various locations within a washroom 200, where the various dispensers 100 are designated by letters A, B, C and D, where:

A represents a tissue dispenser, and/or sensor;
B represents a towel dispenser, and/or sensor;
C represents a fragrance dispenser, and/or sensor; and
D represents a soap or lotion dispenser, and/or sensor.

On one side of the washroom 200 floor space is a men's washroom 205, and on another side of the washroom 200 floor space is a women's washroom 210. As depicted, a centrally located RF transmitter 215 may be employed to assist in servicing the entire washroom 200 floor space if insufficient quiescent RF energy is present and available in the washroom 200 floor space to be scavenged by each energy conversion device 145. In an embodiment, the RF transmitter 215 transmits RF energy in an ISM (Industrial, Scientific, Medical) RF band, which includes 915 MHz. As can be anticipated from the foregoing, it will be appreciated that a complex distribution of RF energy may exist in a space desirable for harvesting such RF energy. As such, it would be desirable to have a device suitable for mapping the magnitude and direction of the RF energy to be harvested. Such a device will now be discussed in connection with FIGS. 6-10.

Figure 6:
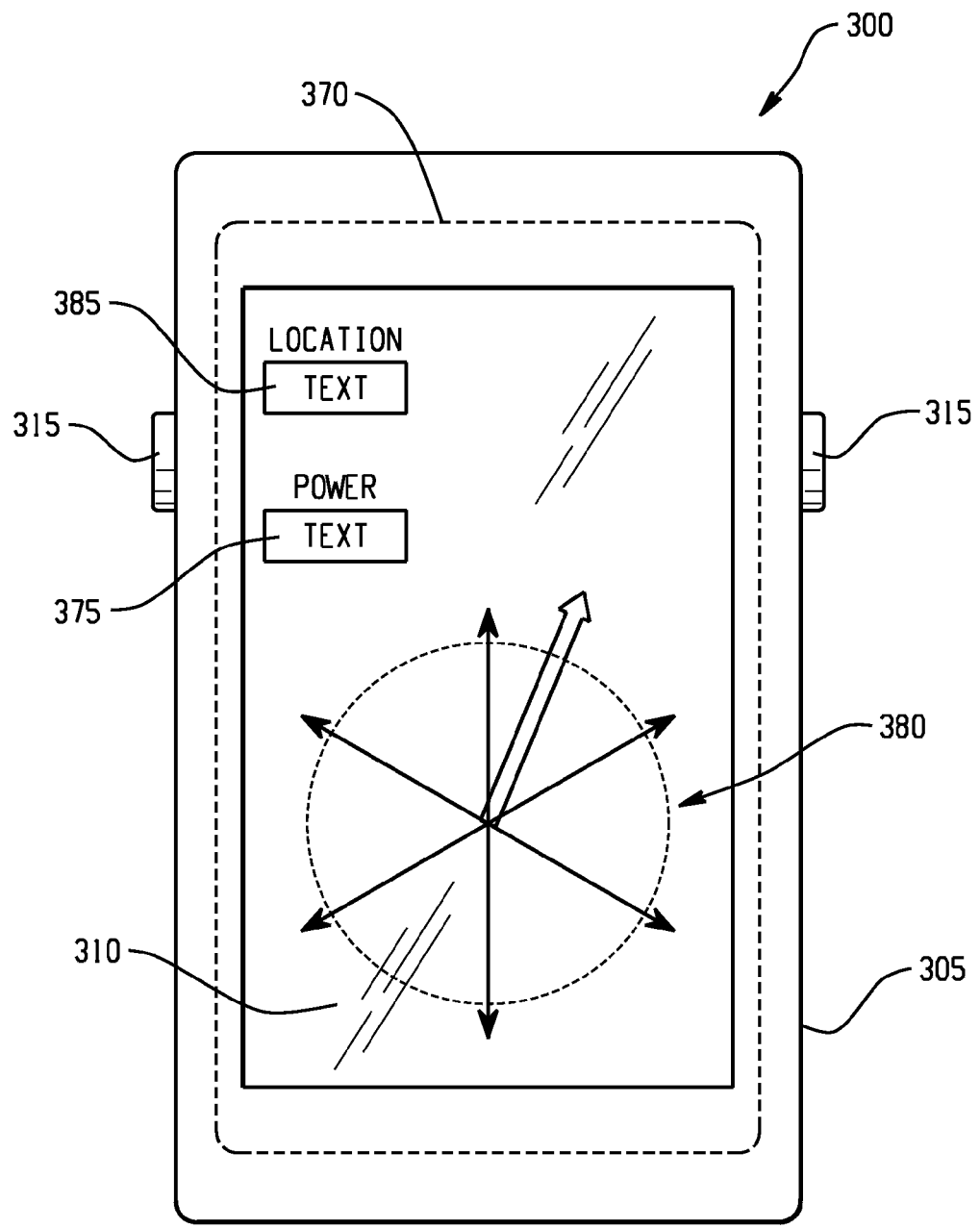
FIG. 6 depicts a handheld meter in accordance with an embodiment of the invention.

An example handheld meter 300 is depicted in FIG. 6 having a housing 305, a user interface screen 310, and at least one user input button 315 for engaging the electronics of the meter for measurement of present ambient electromagnetic energy on command. The user interface button 315 may be located on the left side of the housing 305 for right-handed users, or alternatively on the right side of the housing 305 for left-handed users. Display elements on user interface screen 310 will be discussed further below.

Figure 7:
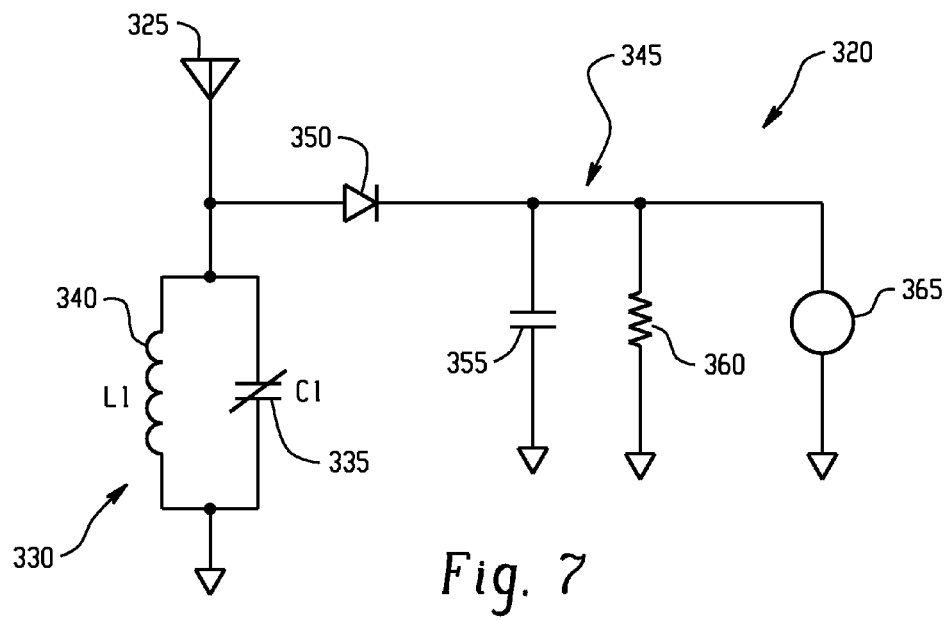
FIG. 7-10 depict alternative arrangements of detection circuitry for use in accordance with an embodiment of the invention.

Referring now to FIG. 7, an example electronic detection circuit 320 is depicted in schematic form for use in an embodiment of the handheld meter 300. An antenna 325 is disposed and configured to receive electromagnetic energy that originates outside of the housing 305. The antenna 325 may be integrally arranged within the housing 305, or may be connected external of the housing 305 via an antenna input port on the housing 305, thereby allowing for use of antennas of different sizes relative to the type of dispenser 100 being tested for.

A tuned circuit 330 is disposed in electrical communication with the antenna 325 for setting a desired resonant frequency and bandwidth. In an embodiment, the tuned circuit 330 is tunable, thereby allowing for testing of RF energy at different frequencies. In an embodiment, the tuned circuit 330 includes a capacitor 335 and an inductor 340 connected in parallel. A detector circuit 345 is disposed in electrical communication with the tuned circuit 330 on a downstream side of a diode 350 for providing an output voltage signal representative of the strength of the RF energy tested. In an embodiment, the detector circuit 345 includes a capacitor 355 and a resistor 360 connected in parallel to ground. The output voltage signal is received at an output device 365 that is disposed in electrical communication with the detector circuit 345. The output device 365 is configured to provide information to a user that relates to the signal strength of the electromagnetic energy received at the antenna 325. In an embodiment, the output device 365 is a sensor sensitive to microvoltages. In an embodiment, the output device 365 is in operable communication with the user interface screen 310, which in an embodiment is controlled by a processor that converts the sensor output into graphical representations for conveying useful information to a user.

Figure 8:
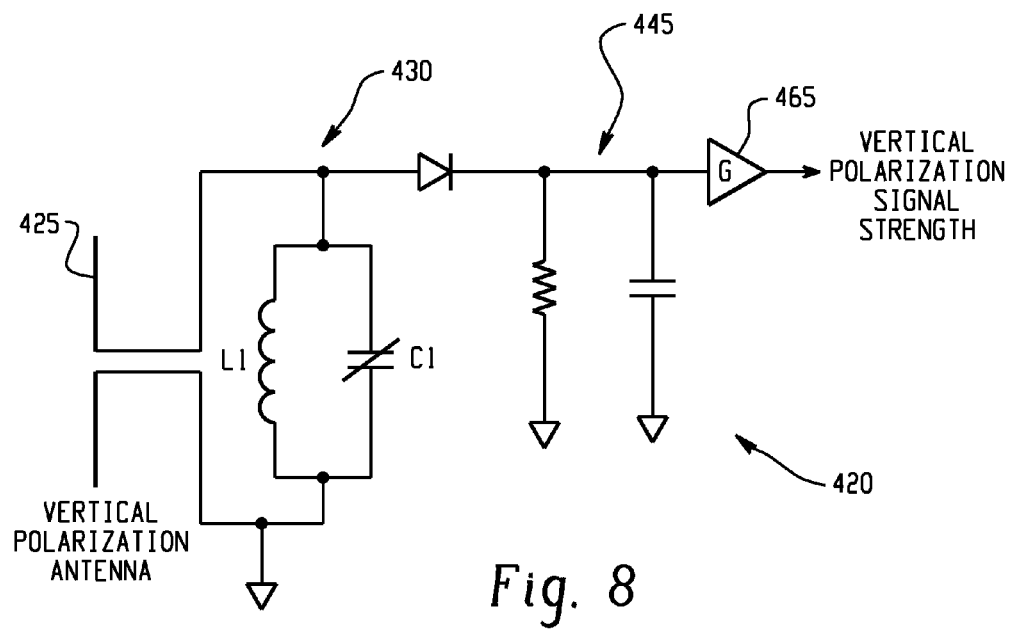
Figure 9:
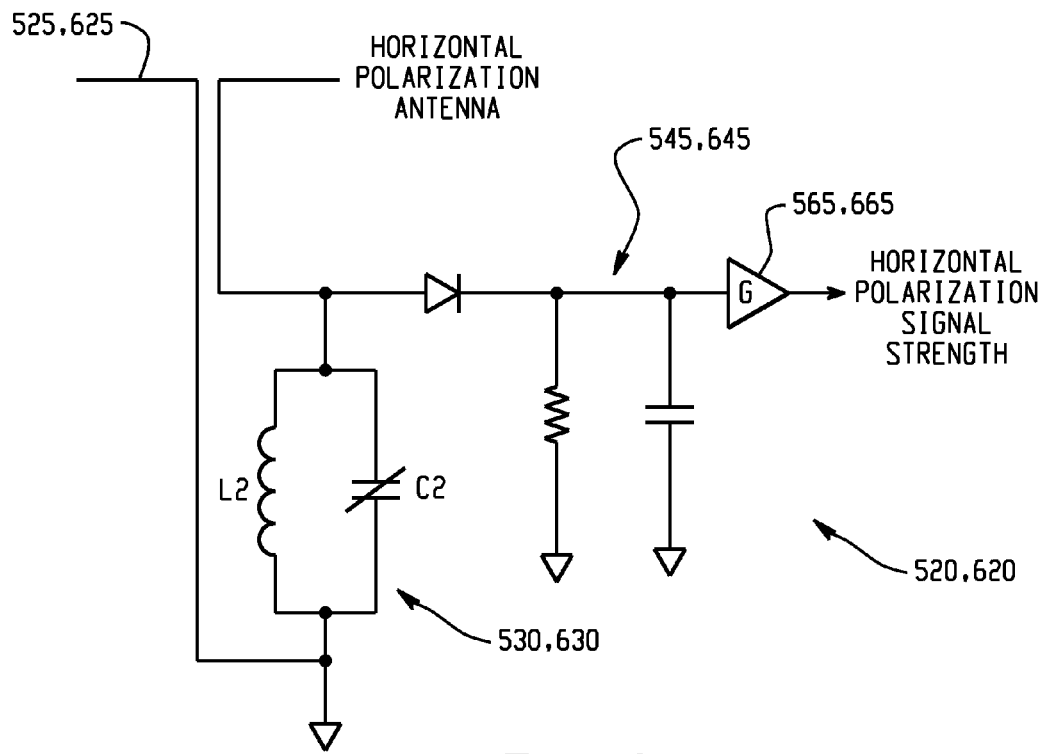

With reference now to FIGS. 8-9, an embodiment of the handheld meter 300 includes two electronic detection circuits 420, 520, where the first detection circuit 420 is as depicted in FIG. 8, and the second detection circuit 520 is as depicted in FIG. 9. The detection circuits 420, 520 of FIGS. 8 and 9 have similar elements as the detection circuit 320 of FIG. 7, where like elements have the same last two digits, that is, elements 325, 425 and 525 all refer to antennas, for example. Other elements follow a similar numbering scheme.

In FIG. 8, the antenna 425 is a first antenna that is disposed and configured to receive vertically polarized electromagnetic energy 120, the tuned circuit 430 is electrically configured similar to the tuned circuit 330 of FIG. 7, and the detector circuit 445 is electrically configured similar to the detector circuit 345 of FIG. 7. In FIG. 8, an output device 465 in the form of an amplifier takes the place of the output device 365 (sensor) in FIG. 7. The output device 465 is disposed in electrical communication with the first detector circuit 445 to provide information to a user that relates to a signal strength of the vertically polarized electromagnetic energy 120 received at the first antenna 425.

In FIG. 9, the antenna 525 is a second antenna that is disposed and configured to receive horizontally polarized electromagnetic energy 120, the tuned circuit 530 is electrically configured similar to the tuned circuit 330 of FIG. 7, and the detector circuit 545 is electrically configured similar to the detector circuit 345 of FIG. 7. In FIG. 9, an output device 565 in the form of an amplifier is configured similar to the amplifier of FIG. 8. The output device 565 is disposed in electrical communication with the second detector circuit 545 to provide information to a user that relates to a signal strength of the horizontally polarized electromagnetic energy 120 received at the second antenna 525. The second antenna 525 is oriented orthogonal with respect to the first antenna 425.

In an embodiment, the output devices 465 and 565 may be integrally arranged as a unitary circuit that separately amplifies the inputs as appropriate for the type of field polarization being analyzed.

Figure 10:
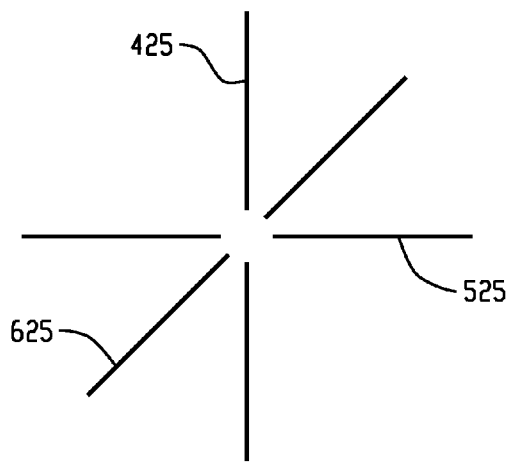

In an alternative embodiment, and with reference now to FIGS. 9 and 10, a third antenna 625 is disposed and configured to receive horizontally polarized electromagnetic energy 120 similar to the second antenna 525, with the difference being that the second antenna 525 is disposed and configured to receive a lateral component of the horizontally polarized electromagnetic energy 120, while the third antenna 625 is disposed and configured to receive a longitudinal component of the horizontally polarized electromagnetic energy 120. As depicted in FIG. 10, the third antenna 625 is oriented orthogonal with respect to the first antenna 425 and orthogonal with respect to the second antenna 525. The third antenna 625 is coupled to a third detection circuit 620 similar to that of the second detection circuit 520. As such, discussion relating to the third detection circuit 620 can be made with reference to FIG. 9 by simply substituting the 500's reference numerals with 600's reference numerals, as indicated by reference numeral pairs 530,630; 545, 645; and 565, 665.

While reference is made herein to a handheld meter 300 having first, second and third antennas 425, 525, 625 arranged orthogonal to one another, it will be appreciated that an embodiment of the invention also includes a handheld meter 300 having only a single antenna, or even two antennas, arranged in a known manner within the handheld meter 300, such that orientation of the handheld meter 300 coupled with field strength readout from the handheld meter 300 will provide useful information to a user about the amount of RF energy available for powering one or more dispensers 100, and about the orientation of the receiving antenna within the dispenser 100 for generating optimal power at the location of interest.

While reference is made herein to a handheld meter 300 employing any combination of first, second and third antennas 425, 525, 625, it will be appreciated that such a handheld meter 300 is not so limited, and may employ a circularly polarized antenna in place of or in addition to the first, second and/or third antennas 425, 525, 625. It is contemplated that such a circularly polarized antenna may be of a type known as a Wok antenna, however, any circularly polarized antenna suitable for a purpose disclosed herein is considered within the scope of the invention disclosed herein.

From the foregoing, it will be appreciated that an integrally arranged output device, such as the aforementioned amplifiers, may be configured to provide information to a user that relates to a signal strength of the vertically polarized electromagnetic energy received at the first antenna 425, a signal strength of the lateral component of the horizontally polarized electromagnetic energy received at the second antenna 525, and a signal strength of the longitudinal component of the horizontally polarized electromagnetic energy received at the third antenna 625.

As discussed above with reference to FIG. 6, the handheld meter 300 includes a user interface 310, and as discussed above with reference to FIGS. 7-10, output devices 365, 465, 565 and 665, for example, provide information to a user that relates to the signal strength of the electromagnetic energy 120 received at the antenna 325, the signal strength of the vertically polarized electromagnetic energy 120 received at the first antenna 425, the signal strength of the lateral component of the horizontally polarized electromagnetic energy 120 received at the second antenna 525, and the signal strength of the longitudinal component of the horizontally polarized electromagnetic energy 120 received at the third antenna 625. In an embodiment, processing of the various signal strength data is accomplished via a processing circuit 370 disposed in electrical communication with respective ones of the detection circuit 320, 420, 520, 620, and the user interface 310. The processing circuit 370 is responsive to machine executable instructions which when executed by a processor of the processing circuit 370 informs a user as to whether the signal strength of the electromagnetic energy 120 received at the antenna, which may be an integrally formed combination antenna of one or more of antennas 325, 425, 525, 625, is increasing or decreasing as the handheld meter 300 is moved from one location to another in the floor space of washroom 200. In an embodiment, the processing circuit 370 calculates the three orthogonal components of the electromagnetic energy 120 and provides power strength information, via text box 375, of one of the orthogonal components. In an embodiment, the processing circuit 370 calculates a vector (Euclidean) sum of the three orthogonal components of the electromagnetic energy 120 obtained from the three orthogonal antennas 420, 520, 620, and provides power strength information, via text box 375, and vector direction information, via vector display 380, at a given location, via text box 385. In an embodiment, the power strength information 375 and the location information 385 also provides a user with a GO/NO-GO disposition. That is, if the location under evaluation has suitable electromagnetic signal power at a suitable vector orientation for pickup by an antenna in a dispenser 100 to actuate the dispenser 100, then the text box 385 will signal such a condition, which detailed via the power level displayed in text box 375 and via the direction of maximum signal strength displayed in the vector display 380.

Figure 11A:
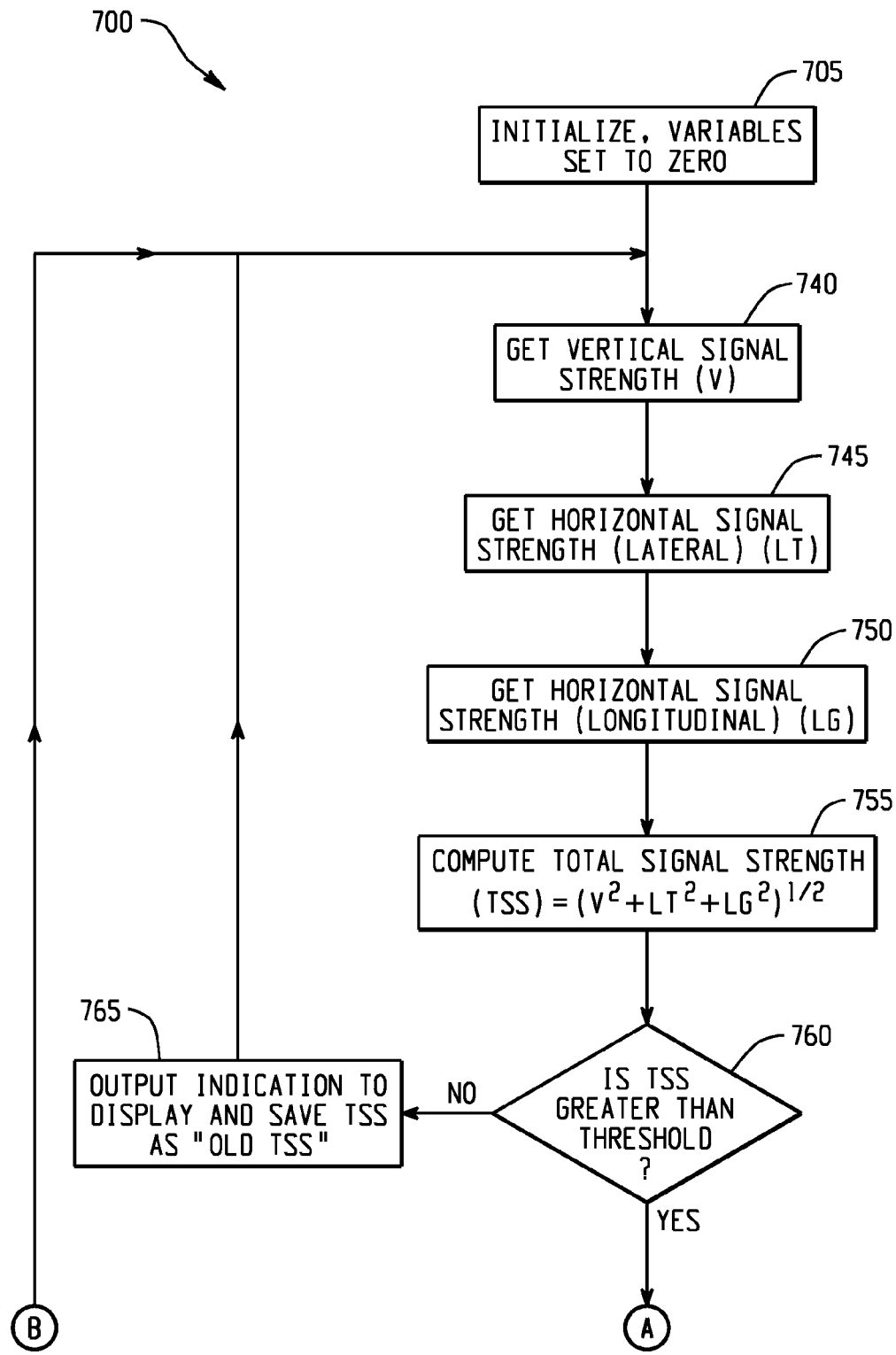
FIGS. 11A and 11B depict a flowchart of a method in accordance with an embodiment of the invention.
Figure 11B:
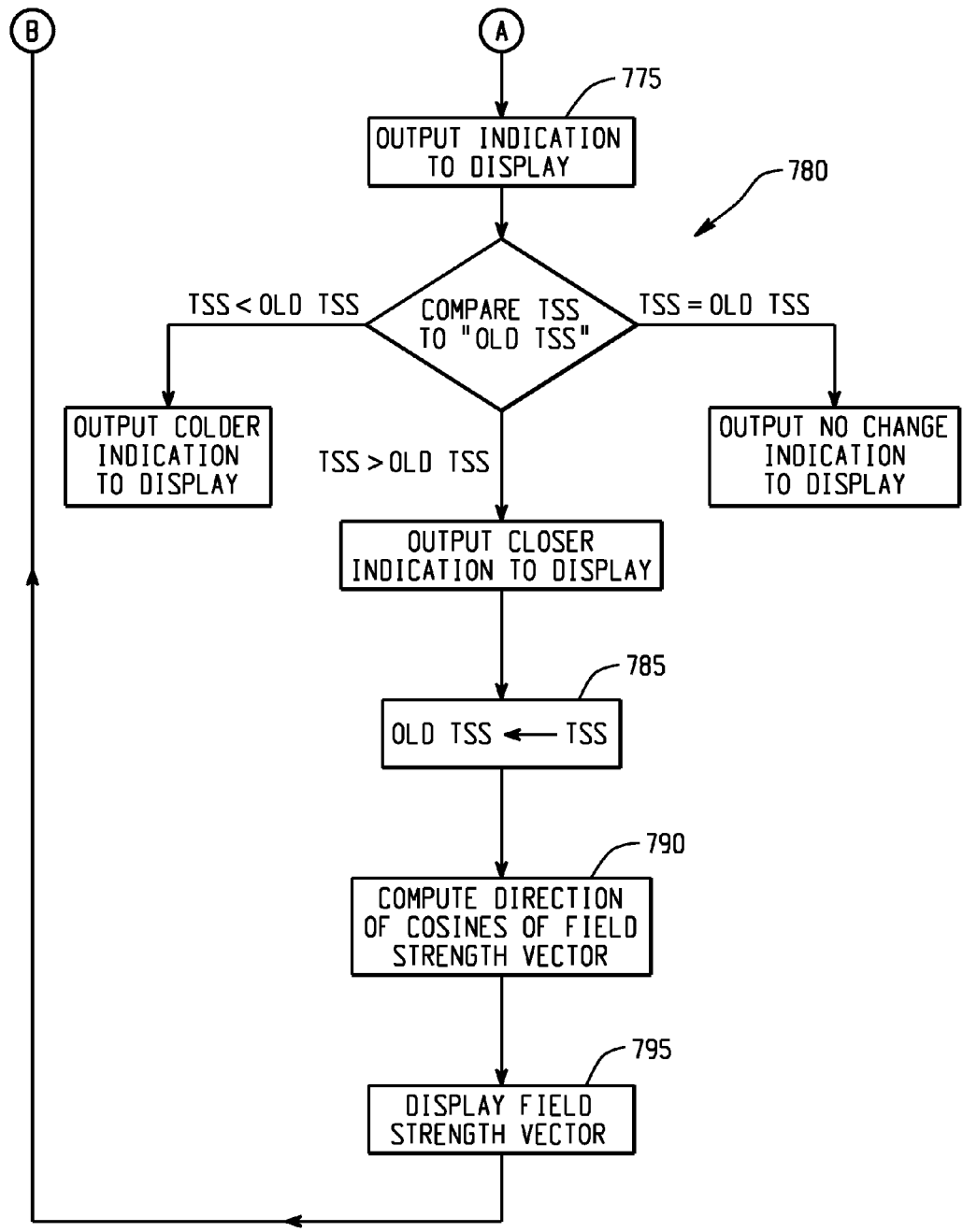

Reference is now made to FIG. 11, which depicts an example method 700 in flowchart form executable by an embodiment of the processing circuit 370 of handheld meter 300. The method 700 is initialized at 705, where a memory register representative of the total electromagnetic field strength being measured is set to zero.

If the physical dimensions of the space under consideration are adequate for installing a dispenser 100, as determined by physical measurement or any other suitable means, then the process flow of method 700 passes to blocks 740, 745, 750, 755 and 760, where the vertical signal strength, the lateral horizontal signal strength, and the longitudinal signal strength of the ambient electromagnetic energy 120 are measured, and the total signal strength calculated, and where it is determined whether sufficient electromagnetic energy 120 is present to power the dispenser 100. If not, then the process flow of method 700 passes to block 765, where the user interface screen 310 displays a "not enough power" message, the memory register is reset, and process flow returns to block 740 ready for another location analysis.

If sufficient electromagnetic energy is present to power the dispenser 100, then the process flow of method 700 passes to block 775 where such information is presented to the user via the user interface screen 310. The process flow of method 700 then passes to process loop 780, where measurement analysis results indicating "warmer" or "colder" is repetitively presented to the user via the user interface screen 310 as the handheld meter 300 is moved about the target location, thereby providing the user with additional information regarding an optimum placement of the dispenser 100. As used herein, the "warmer" and "colder" indications are indications of the electromagnetic energy strength increasing or decreasing as the meter 300 is moved from a first position to a second position within the target location.

Once an optimized target location is established, the process flow of method 700 passes to blocks 785, 790 and 795, where the direction cosines of the electromagnetic field strength vector are calculated and the resultant magnitude displayed for the user via the user interface screen 310, and process flow returns back to block 740 ready for another location analysis with a reset memory register. As discussed above, orientation of the meter coupled with field strength readout at the meter provides useful information relating to power available at a given location for powering one or more dispensers, and provides useful information relating to the optimal orientation of the receiving antenna within each dispenser. Also, by monitoring the meter readout while adjusting the placement and orientation of a transmitter (see transmitter 215 in FIG. 5 for example), useful information relating to the optimal arrangement of the transmitter is also provided. As used herein, the term placement refers to a location in terms of x, y, z coordinates, the term orientation refers to a spatial positioning in terms of rotation about x, y, z axes at a given location, and the term arrangement refers to a combination of placement and orientation.

In an embodiment employing three antennas arranged orthogonal to each other, the algorithm of method 700 would determine the total available power, or signal strength, for a given meter orientation as a vector (Euclidean) sum of the three orthogonal polarization components. In another embodiment employing only a single antenna, the available power, or signal strength, can be determined by orienting the meter until a maximum strength readout is received. Informing the user of the available signal strength at a given meter orientation informs the user as to whether there is enough power at a location and orientation to sustain the power demands of one or more dispensers 100. Additional information provided to the user regarding the field strength relative to a last location examined provides the user with a way of optimizing placement of the dispenser 100. One way of optimizing dispenser placement is for the processing circuit to continuously sample the signals provided by one or more of the three orthogonal antennas 425, 525, 625 at a specified sampling rate. Another way is for the user to control the sampling at discrete time intervals by pressing the user input button 315 on the meter 300, which allows a user to compare widely disparate locations. Either way, displaying the field strength vector on the user interface screen 310 allows the user to select a location where the field strength is best aligned with the dispenser antenna, or provides the user with information on how to best align an externally mounted power receiving antenna with the electromagnetic field in a given location.

While certain combinations of components have been described herein, it will be appreciated that these certain combinations are for illustration purposes only and that any combination of any of the components disclosed herein may be employed in accordance with an embodiment of the invention. Any and all such combinations are contemplated herein and are considered within the scope of the invention disclosed.

While an embodiment of the invention has been described utilizing RF energy as a source of electromagnetic energy, it will be appreciated that the scope of the invention is not so limited, and that the invention also applies to other forms of electromagnetic energy, such as infrared energy or microwave energy for example, harvestable by a suitable receiver. Any and all such types of electromagnetic energy are contemplated herein and are considered within the scope of the invention disclosed.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), erasable programmable read only memory (EPROM), electrically erasable programmable read only memory (EEPROM), or flash memory, for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to harvest and convert ambient electromagnetic energy into electrical power for use by an electrically powered device.

The term "sheet products" as used herein is inclusive of natural and/or synthetic cloth or paper sheets. Sheet products may include both woven and non-woven articles. There are a wide variety of nonwoven processes and they can be either wetlaid or drylaid. Some examples include hydroentagled (sometimes called spunlace), DRC (double re-creped), airlaid, spunbond, carded, paper towel, and meltblown sheet products. Further, sheet products may contain fibrous cellulosic materials that may be derived from natural sources, such as wood pulp fibers, as well as other fibrous material characterized by having hydroxyl groups attached to the polymer backbone. These include glass fibers and synthetic fibers modified with hydroxyl groups. Examples of sheet products include, but are not limited to, wipers, napkins, tissues, rolls, towels or other fibrous, film, polymer, or filamentary products.

In general sheet products are thin in comparison to their length and breadth and exhibit a relatively flat planar configuration and are flexible to permit folding, rolling, stacking, and the like. The sheet product may have perforations extending in lines across its width to separate individual sheets and facilitate separation or tearing of individual sheets from a roll or folded arrangement at discrete intervals. Individual sheets may be sized as desired to accommodate the many uses of the sheet products. For example, perforation lines may be formed every 13 inches, or other defined interval, to define a universally sized sheet. Multiple perforation lines may be provided to allow the user to select the size of sheet depending on the particular need. However, other configurations are possible.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system comprising:
a dispenser configured to support and dispense a product; and
a transmitter configured to transmit electromagnetic energy, and disposed in operable communication with the dispenser;
wherein the dispenser comprises:
a main housing;
a battery housing disposed within the main housing, the battery housing comprising electrical terminals;
a plurality of battery cells disposed within the battery housing and electrically connected to the electrical terminals of the battery housing, the plurality of battery cells configured to provide DC (direct current) power;
an antenna disposed outside of the battery housing and configured to receive the electromagnetic energy that originates from the transmitter;
a power supply disposed within the main housing and outside of the battery housing, the power supply configured to convert the electromagnetic energy received at the antenna into DC (direct current) power;
a dispenser mechanism configured and disposed to dispense the product from the dispenser on command;
a controller disposed in operable communication with the power supply and the dispenser mechanism;
a connection disposed between the controller, the battery housing, and the power supply, the connection configured to selectively provide DC power to the controller from the plurality of battery cells during a first operating mode and from the power supply during a second operating mode; and
an actuator disposed in operable communication with the controller;
wherein upon actuation of the actuator, and upon presence of DC power, the controller is responsive to facilitate action by the dispenser mechanism to dispense the product.

2. The system of claim 1, wherein the power supply comprises a boost converter to provide the DC power at a stepped up voltage on an output side of the boost converter relative to an input side of the boost converter.

3. The system of claim 1, wherein the power supply comprises:
an energy conversion device disposed and configured to convert the electromagnetic energy received at the antenna into DC (direct current) power at a first voltage level;
a boost converter comprising a boost converter controller, the boost converter configured and disposed to convert the DC power at the first voltage level into DC power at a second voltage level greater than the first voltage level; and
an energy storage device electrically connected in power communication with the energy conversion device and the boost converter, the energy storage device configured to receive and store the DC power at the first voltage level, the boost converter configured to controllably discharge energy from the energy storage device and to deliver the DC power at the second voltage level to the controller.

4. The system of claim 3, wherein the energy storage device comprises a capacitor or a rechargeable battery.

5. The system of claim 3, wherein the power supply further comprises an energy storage inductive device electrically connected between the energy storage device and the boost converter controller, the boost converter controller configured to switch the energy storage inductive device in and out of a circuit path configured to deliver the DC power at the second voltage level.

6. The system of claim 1, wherein the connection comprises a switch configured to selectively connect the controller to the plurality of battery cells during the first operating mode and to the power supply during the second operating mode.

7. The system of claim 1, wherein the power supply comprises a regulator to provide the DC power at a regulated DC voltage.

8. A power unit for a product dispenser configured for battery operation, the dispenser having a main housing and a battery housing with electrical terminals disposed within the main housing, the power unit comprising:
- an antenna configured to receive electromagnetic energy; and
- a power supply disposed and configured to convert the electromagnetic energy received at the antenna into DC (direct current) power;
- wherein the antenna and the power supply are configured to fit within the battery housing, and wherein the power supply is configured to electrically connect to the electrical terminals of the battery housing.

9. The power unit of claim 8, wherein the power supply comprises a boost converter to provide the DC power at a stepped up voltage on an output side of the boost converter relative to an input side of the boost converter.

10. The power unit of claim 8, wherein the power supply comprises:
- an energy conversion device disposed and configured to convert the electromagnetic energy received at the antenna into DC (direct current) power at a first voltage level;
- a boost converter comprising a boost converter controller, the boost converter configured and disposed to convert the DC power at the first voltage level into DC power at a second voltage level greater than the first voltage level; and
- an energy storage device electrically connected between the energy conversion device and the boost converter, the energy storage device configured to receive and store the DC power at the first voltage level, the boost converter configured to controllably discharge energy from the energy storage device and to deliver the DC power at the second voltage level to a controller of the product dispenser.

11. The power unit of claim 10, wherein the energy storage device comprises a capacitor or a rechargeable battery.

12. The power unit of claim 10, wherein the power supply further comprises an energy storage inductive device electrically connected between the energy storage device and the boost converter controller, the boost converter controller configured to switch the energy storage inductive device in and out of a circuit path configured to deliver the DC power at the second voltage level.

13. A handheld meter, comprising:
- a housing;
- an antenna disposed and configured to receive electromagnetic energy that originates outside of the housing;
- a tuned circuit disposed in electrical communication with the antenna;
- a detector circuit disposed in electrical communication with the tuned circuit; and
- an output device disposed in electrical communication with the detector circuit, the output device being configured to provide information to a user that relates to a signal strength of the electromagnetic energy received at the antenna;
- wherein the information relates to an amount of RF energy available for powering one or more product dispensers, and relates to an orientation of a receiving antenna of an associated one of the product dispensers for generating optimal power at a location of interest for placement of the associated one of the product dispensers.

14. The meter of claim 13, wherein the output device comprises a voltage sensor.

15. The meter of claim 13, wherein the antenna is a first antenna disposed and configured to receive vertically polarized electromagnetic energy, the tuned circuit is a first tuned circuit, and the detector circuit is a first detector circuit, and wherein the meter further comprises:
- a second antenna disposed and configured to receive horizontally polarized electromagnetic energy, the second antenna oriented orthogonal with respect to the first antenna;
- a second tuned circuit disposed in electrical communication with the second antenna; and
- a second detector circuit disposed in electrical communication with the second tuned circuit;
- wherein the output device is disposed in electrical communication with the first detector circuit and the second detector circuit, the output device configured to provide the information to the user that relates to a signal strength of the vertically polarized electromagnetic energy received at the first antenna, and/or the horizontally polarized electromagnetic energy received at the second antenna.

16. The meter of claim 15, wherein the second antenna is disposed and configured to receive a lateral component of the horizontally polarized electromagnetic energy, and wherein the meter further comprises:
- a third antenna disposed and configured to receive a longitudinal component of the horizontally polarized electromagnetic energy, the third antenna oriented orthogonal with respect to the first antenna and orthogonal with respect to the second antenna;
- a third tuned circuit disposed in electrical communication with the third antenna; and
- a third detector circuit disposed in electrical communication with the third tuned circuit;
- wherein the output device is disposed in electrical communication with the first detector circuit, the second detector circuit, and the third detector circuit, the output device configured to provide the information to the user that relates to a signal strength of the vertically polarized electromagnetic energy received at the first antenna, and/or a signal strength of the lateral component of the horizontally polarized electromagnetic energy received at the second antenna, and/or a signal strength of the longitudinal component of the horizontally polarized electromagnetic energy received at the third antenna.

17. The meter of claim 13, wherein the output device comprises a user interface, and wherein the meter further comprises a processing circuit disposed in electrical communication with the detector circuit and the user interface, the processing circuit responsive to machine executable instructions which when executed by a processor informs the user as to whether the signal strength of the electromagnetic energy received at the antenna is increasing or decreasing as the meter is moved from one location to another.

18. The system of claim 1, wherein the connection is configured to select between the first operating mode and the second operating mode of the connection.

19. The system of claim 18, wherein the controller is configured to select the first operating mode of the connection when the dispenser mechanism is operational and the second operating mode of the connection when the dispenser mechanism is not operational.

20. A system comprising:
- a dispenser configured to support and dispense a product; and
- a transmitter configured to transmit electromagnetic energy, and disposed in operable communication with the dispenser;
- wherein the dispenser comprises:
  - a main housing;

a battery housing disposed within the main housing and configured to house a plurality of battery cells, the battery housing comprising electrical terminals configured to connect to the plurality of battery cells;

an antenna disposed within the battery housing and configured to receive the electromagnetic energy that originates from the transmitter;

a power supply disposed within the battery housing and electrically connected to the electrical terminals of the battery housing, the power supply configured to convert the electromagnetic energy received at the antenna into DC (direct current) power;

a dispenser mechanism configured and disposed to dispense the product from the dispenser on command;

a controller disposed in operable communication with the power supply and the dispenser mechanism; and an actuator disposed in operable communication with the controller;

wherein upon actuation of the actuator, and upon presence of DC power, the controller is responsive to facilitate action by the dispenser mechanism to dispense the product.

21. A system comprising:

a dispenser configured to support and dispense a product; and a transmitter configured to transmit electromagnetic energy, and disposed in operable communication with the dispenser;

wherein the dispenser comprises:

a main housing;

an energy storage device housing disposed within the main housing and configured to house an energy storage device, the energy storage device housing comprising electrical terminals configured to connect to the energy storage device;

an antenna disposed within the energy storage device housing and configured to receive the electromagnetic energy that originates from the transmitter;

a power supply disposed within the energy storage device housing and electrically connected to the electrical terminals of the energy storage device housing, the power supply configured to convert the electromagnetic energy received at the antenna into DC (direct current) power;

a dispenser mechanism configured and disposed to dispense the product from the dispenser on command;

a controller disposed in operable communication with the power supply and the dispenser mechanism; and an actuator disposed in operable communication with the controller;

wherein upon actuation of the actuator, and upon presence of DC power, the controller is responsive to facilitate action by the dispenser mechanism to dispense the product.

22. The system of claim 21, wherein the energy storage device comprises a battery.

* * * * *